E. R. CALTHROP.
PARACHUTE.
APPLICATION FILED JULY 31, 1918.
1,299,122.
Patented Apr. 1, 1919.
4 SHEETS—SHEET 2.
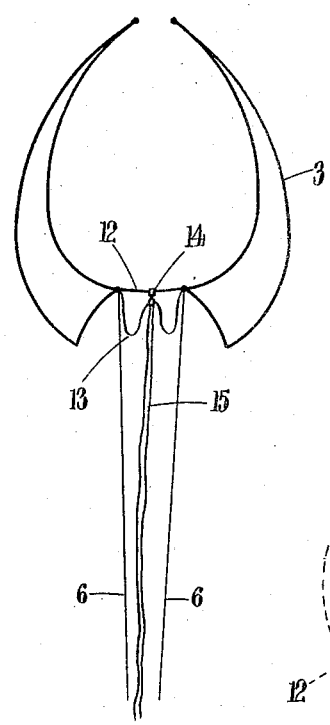
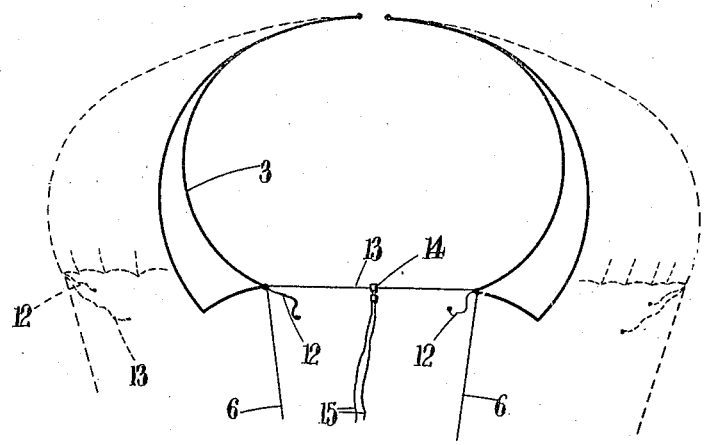
Everard Richard Calthrop
INVENTOR
by
Attorney

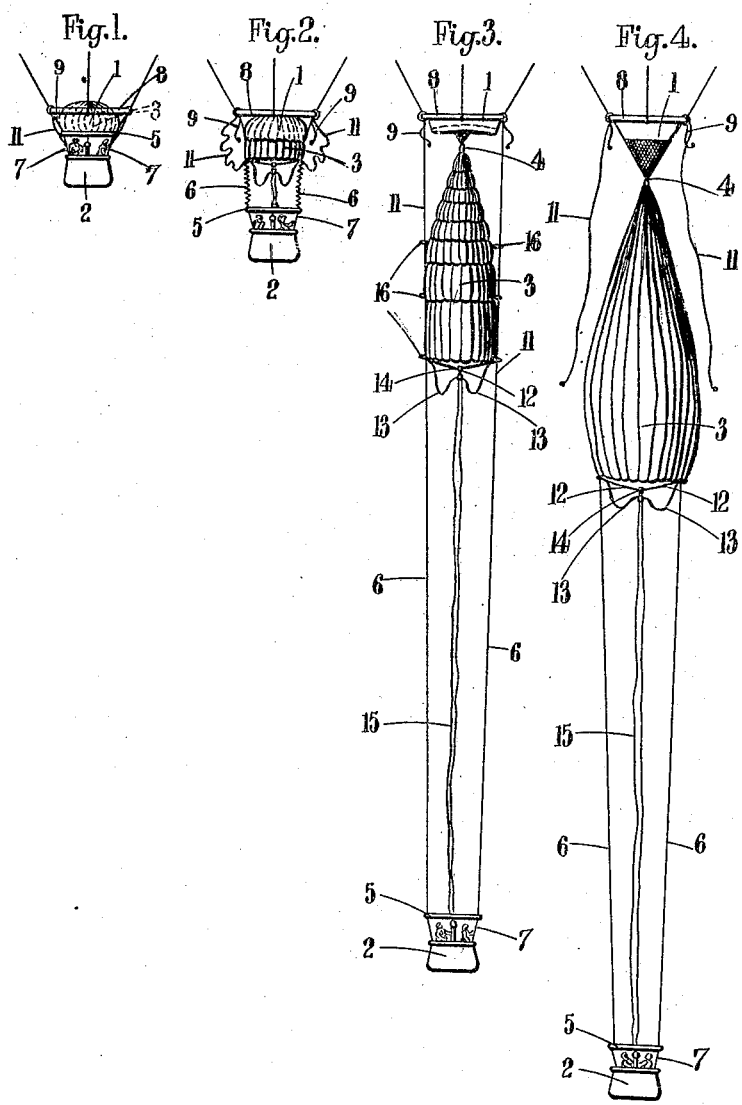

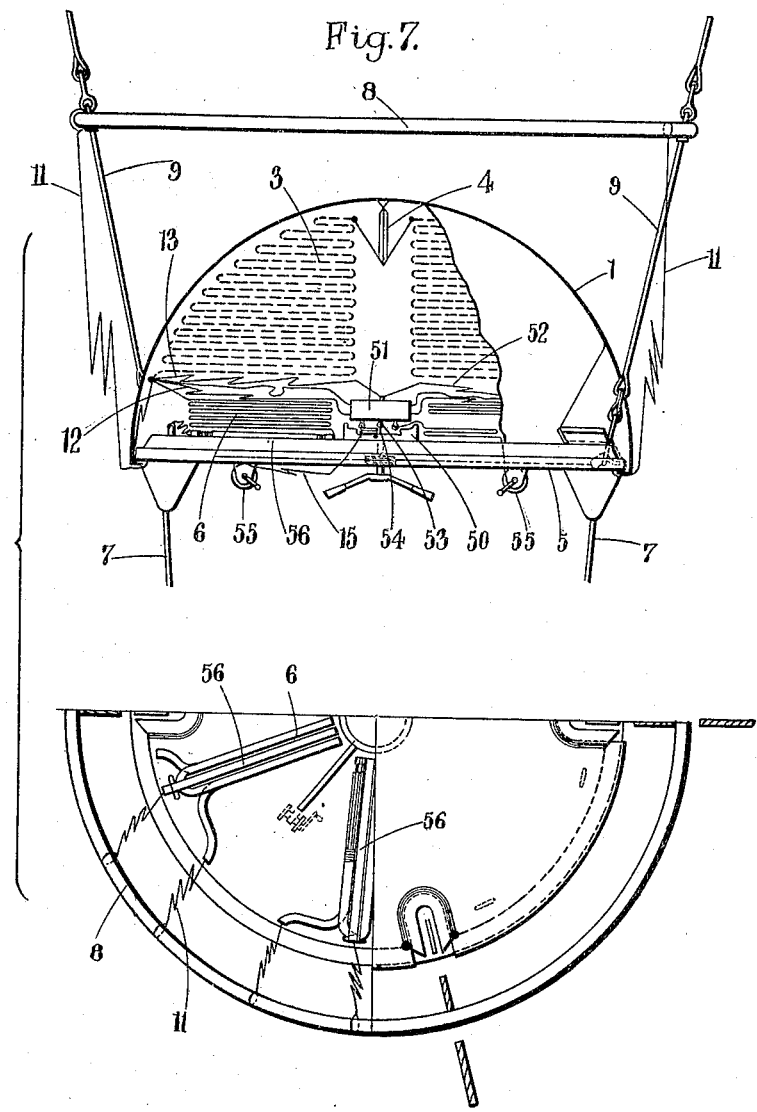

E. R. CALTHROP.
PARACHUTE.
APPLICATION FILED JULY 31, 1918.
1,299,122.
Patented Apr. 1, 1919.
4 SHEETS—SHEET 4.
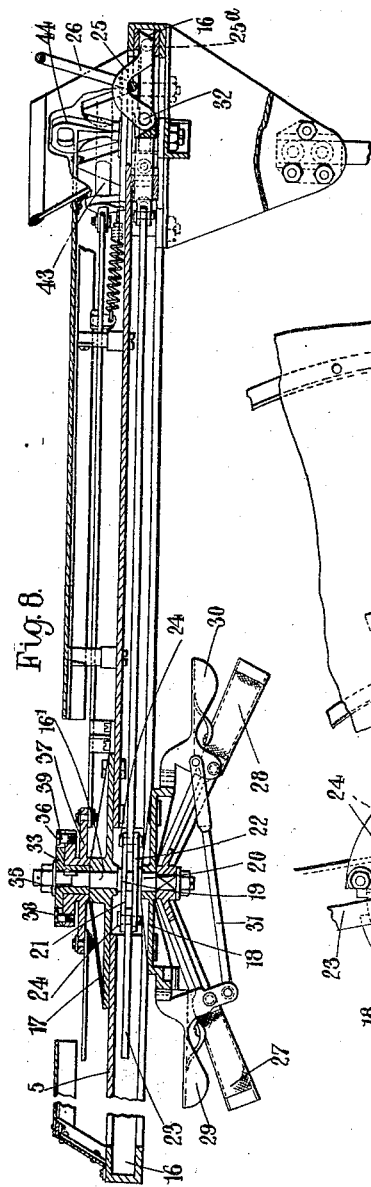
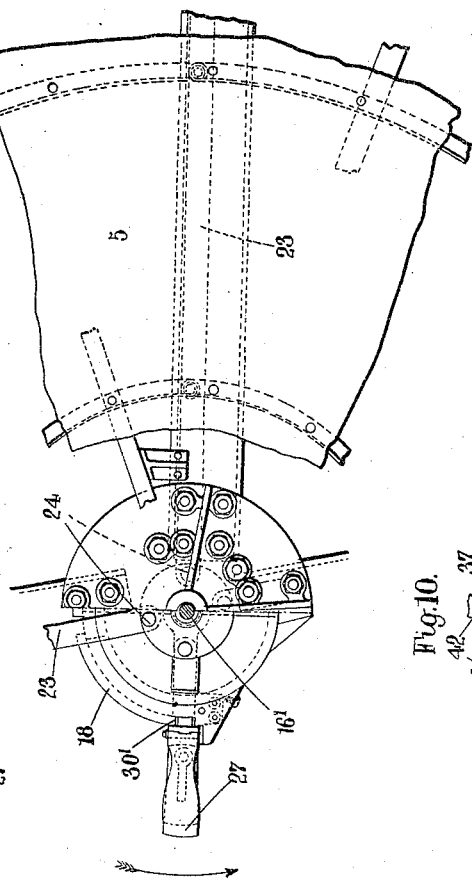
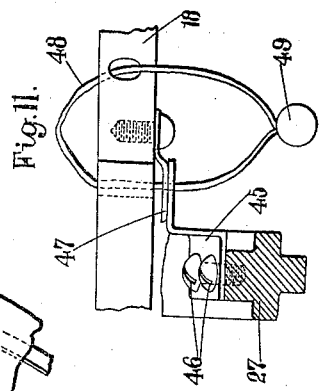
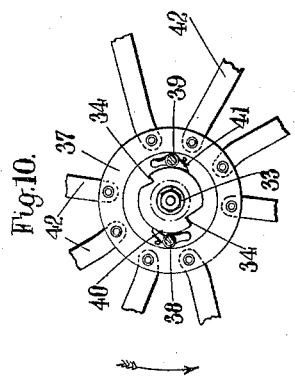
*Everard Richard Calthrop*
INVENTOR
Attorney

UNITED STATES PATENT OFFICE.

EVERARD R. CALTHROP, OF LONDON, ENGLAND, ASSIGNOR TO E. R. CALTHROP'S AERIAL PATENTS LIMITED, OF LONDON, ENGLAND.

PARACHUTE.

1,299,122.  Specification of Letters Patent.  Patented Apr. 1, 1919.

Application filed July 31, 1918. Serial No. 247,510.

*To all whom it may concern:*

Be it known that I, EVERARD RICHARD CALTHROP, a subject of the King of Great Britain, residing at London, in the county of Middlesex, England, have invented new and useful Improvements Relating to Parachutes, of which the following is a specification.

This invention has reference to parachutes and launching devices therefor and the particular object I have in view is to provide an improved device adapted for use with aerial craft such as kite or other balloons or airships whereby the car or basket containing the aeronaut may be detached from the aerial craft in case of necessity and caused to be supported by the parachute in its descent to the ground.

In connection with aeroplanes it has been proposed to provide the machine with a parachute disposed in a container and connected with the aviator's seat and with means for releasing the parachute and seat so that the seated aviator and the parachute become detached from the aeroplane for the purpose of making a safe descent.

Broadly considered the invention comprises the combination with a balloon basket or passenger containing device sustained in air of a parachute and means for detaching the parachute and passenger containing device from the sustaining element.

More specifically considered the invention consists of means whereby a passenger compartment and a parachute secured thereto may be sustained in air and released from the sustaining element and the parachute launched in such a manner as to insure its eventual complete expansion and means for controlling the speed of descent of the parachute and passenger compartment.

The aforesaid ends which I have in view and such others as may hereinafter appear or are incidental to the invention may be attained by the means which I will now proceed to describe in detail with reference to the accompanying drawings in which:

Figures 1 to 6 are diagrams explaining the operation of a device embodying this invention.

Fig. 7 is a view partly in elevation and partly in plan showing the general arrangement of one form of the invention.

Fig. 8 is a vertical section of the mechanically operated basket-releasing and tape-controlling mechanism to be hereinafter more particularly described and, Figs. 9, 10 and 11 are details of Fig. 8.

Referring now to Figs. 1 to 6 I will first describe the general functions and sequence of operations of a device embodying my invention and will then proceed with more particular reference to the remaining figures to a consideration of the various mechanical details whereby such functions and operations may be conveniently accomplished.

The numeral 1 indicates a suitable container or cover of waterproof and fireproof flexible material which is suspended above the basket or car 2 of the balloon or the like and within which the parachute body 3 is packed or nested the apex of the parachute being detachably connected to said cover 1 by a breaking piece 4 the function of which will presently be explained.

The aforesaid container 1 is closed by a preferably rigid plate 5 which serves to support the parachute body 3 within the container and also to support the packs of rigging tapes 6. The car or basket 2 of the balloon is positively connected to said plate 5 by cords or the like 7 and the car or basket and plate 5 supported from the ring 8 of the balloon by cords 9 held by a releasing device under control of the aeronaut. The construction and operation of this releasing device will presently be described in detail with reference to Figs. 7 to 11 but in the diagrams (Figs. 1 to 5) now being considered it is indicated as a whole by the numeral 5.

Attached to the ring 8 of the balloon or to some other suitable part of the aircraft are a plurality of easily rupturable cords or threads 11—which may be of different lengths to dis-synchronize the shocks of their breaking—the opposite ends of said cords or threads being attached to the eyelets in the periphery of the parachute body which connect with the rigging tapes 6 or the tapes themselves. I also positively attach to said eyelets (or to the tapes 6) two sets of tapes or the like 12 and 13 respectively one set being of greater length than the other and the free ends of both sets are detachably held by a preferably centrally disposed release gear 14 adapted to be operated through suitable cords 15 by the aeronauts in the car or by mechanically controlled means in such a manner that the ends of both sets of tapes 12 and 13 may be released independently.

When a descent is to be made the aeronaut in the car first operates the device 5 for releasing the cords or stays 9 which serve to suspend the car or basket 2 from the balloon and the load thus released immediately drops together with the aforesaid lower plate 5 the rigging tapes 6 are extended and the periphery of the parachute body 3 leaves the container 1. The aforesaid light and easily rupturable cords 11 which may be of sufficient strength to overcome the frictional resistance of the rigging tapes retained in packs by rubber rings, will thus be extended into a straight line (see Fig. 3) with the rigging tapes 6 under the weight of the falling load and will not only hold the mouth of the parachute body 3 in a circle to insure the entry of air to the interior to complete its eventual full expansion but will also form a cage surrounding the parachute body to prevent its deformation by adverse wind pressure and such deformation may be further counteracted by the provision of rings 16 secured to the parachute body 3 at suitable distances apart from the periphery upward through which rings the breaking cords 11 are threaded. By this means not only is the periphery of the parachute body held in a circle but the upper parts of said body are also held in circles so that a column of air is contained therein. As the rigging tapes 6 become taut the easily rupturable cords or threads 11 will of course snap dis-synchronously under the strain exerted upon them by the load (see Fig. 4) thus automatically releasing the parachute body from their restraining influence. After this has occurred the weight of the load will be exerted upon the breaking piece 4 connecting the apex of the parachute body 3 to the container 1 and this latter will be turned inside out and the breaking piece 4 will snap under the load but owing to the provision of the sets of short tapes 12 above referred to the mouth of the parachute body 3 will be prevented from expanding further until the aeronaut in the car operates the release gear 14 to free the ends of this set of short tapes whereupon the mouth of the parachute body 3 will open until arrested by the longer tapes 13 in which position it will be retained (see Fig. 6) until the passenger again operates the release gear 14 to free the ends of said tapes 13 when the parachute body will be free to expand to its full extent.

A device operating as hereinbefore described provides for three distinct speeds in descent that is to say immediately after the load is released and the parachute body has been separated from its container and the aforesaid rupturable cords 11 are broken the parachute drops at a high but constant speed which continues until the aforesaid short tapes 12 are released by the aeronaut when a second or intermediate and constant speed is obtained which continues until the longer tapes 13 are released by the aeronaut whereupon the parachute body 3 expands to its full extent and descends at a third slow speed to permit a safe and easy landing being made.

I will now proceed to a consideration of the mechanism whereby the car or passenger containing device 2 and its parachute is separated from the aerial craft when a descent is to be made. Referring to Figs. 7 to 11 the plate 5 which is circular has its periphery bent downwardly and inwardly to form the channel 16. Through a central opening in the plate passes a shaft or spindle 16' housed so as to rotate between flanged disks 17 and 18 secured to plate 5 by bolts. Collars 19 and 20 on the shaft 16' serve to localize the shaft and said collars carry flanges 21 and 22 spaced apart to accommodate a number of rods pivotally secured by bolts or pins 24 to the flanges 21 and 22. Each of the rods 23 are pivotally connected to a hooked member 25 adapted to engage a ring 26 secured to each of the cords 9 which support the plate 5. In the position shown in Fig. 8 the rods 23 maintain the hook members 25 in the position in which the nose 25$^a$ is engaged in the channel 16.

The shaft or spindle 16' has keyed thereto the operating handles 27 and 28 each of which carries a spring biased locking member 29 and 30 normally engaging in slots 30' in the disk 18 and a rod 31 is provided to couple each locking member so that when one is operated both members are withdrawn from the disk 18.

The operation of this releasing mechanism is as follows: When it is desired to release the basket from an aerial craft the locking members 29 and 30 are gripped to release the operating handles 27 and 28 which are then rotated counter-clockwise—see Fig. 9—and through shaft 16' and disks 21 and 22 retract the rods or bolts 23 thereby causing the hook members 25—of which there are for example four—to be withdrawn from the channel 16 whereupon the weight of the basket causes the hook members 25 to rotate about the pivots 32 and swing clear of the rings 26 attached to cords 9.

The completion of this operation sets the mechanism so as to enable the parachute itself to be released from the basket at the will of the aeronaut as soon as the basket touches earth. This is accomplished as follows: Spindle 16' carries a flanged sleeve 33 splined thereto and having notches 34 therein another sleeve 35 having flanges 36 and 37 embraces the sleeve 33 and is free to rotate. Bolts 38 and 39 are screwed into flange 36 and are provided with spring biased pawls 40 and 41. The flange 37 has a number of rods 42 pivotally secured thereto and each of these rods is connected to a bolt 43 (see Fig. 8) passing through a conical eye pin 44 connected to the rigging tapes 6.

The operation of releasing the basket brings the notched flange of sleeve 33 into the position in which each pawl engages a notch 34—see Fig. 10. At this point the parachute and basket are falling to earth the parachute being controlled in speed as hereinbefore referred to and hereinafter described.

When the basket touches earth the aeronaut rotates the operating handles 27 and 28 in a counter-clockwise direction (see arrow, Fig. 10) and thereby withdraws the bolts 43 from the eye pins 44 thus instantly releasing the rigging tapes 6 before the parachute body can exert a lateral or horizontal pull upon the basket.

It would be as well to mention here a protective device for detecting any unauthorized operation or manipulation of the control mechanism. This device shown in Fig. 11 comprises an angle plate 45 secured by screws 46 to the body of the operating handles 27 or 28. When the parts are in the "ready" position shown in Figs. 8 and 9 the plate 45 is juxtaposed with respect to a plate 47 carried by the flange or disk 18. Each plate is perforated and a soft wire 48 is threaded through the holes and through disk 18 so that both ends can be twisted and held by a seal 49. It will be clear that any operation of the mechanism will sever the soft wire 48 and allow same with seal to hang loose.

The mechanism for obtaining a number of different speeds of descent will now be described with reference to Fig. 7. Mounted on the plate 5 is a recessed support 50 in which is seated a clock mechanism or other suitable motor 51—which is the device diagrammatically represented as 14 in Figs. 1 to 4—said motor being connected by cords or tapes 52 to the periphery of the parachute body 3. A trigger 53 to start the motor is provided and is connected by a breaking piece 54 to the support 50.

The free ends of each of the short tapes 12 and of the longer tapes 13 are secured by a clutch or trigger members actuated by the motor 51 when in operation to release both sets of tapes successively after a predetermined time interval.

When the above described basket-releasing mechanism is operated the basket 2 and plate 5 drop and the motor 51 is started by the breaking piece 54 which then snaps the motor being supported by the cords 52 and so prevented from falling upon the occupants of the basket.

As stated in the foregoing description of Figs. 1 to 6 the cords 15 are intended to provide for manual control of the tape release gear indicated diagrammatically by the numeral 14. This release gear may be purely manually operated in which case the operation is as described with reference to Figs. 1 to 6 but in the case of a clock or other motor being employed the cords 15 may be utilized as an independent control of the release gear that is to say one or both sets of tapes 12, 13 may be released in advance of the motor. It will be apparent that it is advantageous to provide a release gear which is both manually and automatically controlled for the reason that in the event of the occupants of the basket being wounded or incapacitated and only just able to release the basket to commence the descent the changes in speed will then be effected automatically by the motor mechanism.

To avoid tangling of the cords 15 or fouling with other parts of the apparatus they are preferably coiled and lie on the support 50 or on the plate 5 and are then led to reels 55 supported on the underside of the plate 5. By operating said reels the occupants of the basket may release the tapes 12, 13 before making a descent so that the parachute will then open to its full extent when the basket is released as above described.

Preferably each of the rigging tapes 6 is provided at the end where they join the plate 5 with a rubber shock absorber 56 to diminish the shock on the tapes 6.

It is of course obvious that by multiplying the aforesaid sets of restraining tapes between the periphery of the parachute body and the centrally disposed releasing gear any desired number of speeds may be obtained and this aspect of my invention is not to be considered as limited to three speeds only.

While I have described the preferred construction of parts and operation thereof I am aware that numerous changes of construction and operation may be made without departing from the spirit and scope of the invention and I therefore do not wish to be understood as limiting the scope of my claims by the positive terms employed in connection with the description.

I claim:—

1. In aerial craft, a sustaining element, a passenger containing element, a parachute connected to the passenger containing element and means for detaching the parachute and passenger containing element from the sustaining element, said detaching means comprising a number of rods adapted to be retracted by the rotation of operating handles, said means being suspended between the parachute and the passenger containing element and being itself detached from the sustaining element along with the parachute and passenger containing element.

2. In aerial craft, the combination of a sustaining element, a passenger containing device, means for securing said passenger containing device to the sustaining element, means for securing a parachute to the sustaining element, said passenger containing device and parachute being sustained in air by the sustaining element, means for releasing said passenger containing device and parachute from the sustaining element; means for launching the parachute so as to insure its eventual complete expansion, and means for controlling the speed of descent of the parachute and passenger containing device.

3. In aerial craft, the combination of a sustaining element, a passenger containing device, means for securing said passenger containing device to the sustaining element, means for securing a parachute to the sustaining element, said passenger containing device and parachute being sustained in air by the sustaining element, means for releasing said passenger containing device and parachute from the sustaining element, means for launching the parachute so as to insure its eventual complete expansion and means for establishing and controlling multiple speeds of descent of the parachute and passenger containing device.

4. In aerial craft, the combination of a sustaining element, a passenger containing device, means for securing said passenger containing device to the sustaining element, means for securing a parachute to the sustaining element, said passenger containing device and parachute being sustained in air by the sustaining element, means for releasing said passenger containing device and parachute from the sustaining element, means for launching the parachute so as to insure its eventual complete expansion, and means comprising a mechanical device for establishing, controlling and varying, by the aeronaut, the speed of descent of the parachute and passenger containing device.

5. In aerial craft, the combination of a sustaining element, a passenger containing device, means for securing said passenger containing device to the sustaining element, means for securing a parachute to the sustaining element, said passenger containing device and parachute being sustained in air by the sustaining element, means for releasing said passenger containing device and parachute from the sustaining element, means for launching the parachute so as to insure its eventual complete expansion and means for automatically varying the speed of descent of the parachute and passenger containing device.

6. In aerial craft, the combination of a sustaining element, a passenger containing device, means for securing said passenger containing device to the sustaining element, said passenger containing device and parachute being sustained in air by the sustaining element, means for releasing said passenger containing device and parachute from the sustaining element, means for launching the parachute so as to insure its eventual complete expansion, means for controlling the speed of descent of the parachute and passenger containing device, and means controlled by the aeronaut for detaching the passenger containing device from the parachute body.

7. In aerial craft the combination of a sustaining element and passenger containing device, means for securing said passenger containing device to the sustaining element, a parachute, means for securing said parachute to the sustaining element, said passenger containing device and parachute being sustained in air by the sustaining element, a container for the parachute, a breaking piece connecting the apex of the parachute body with said container, a rigid plate closing said container, cords connecting the passenger containing device to said plate, cords from a balloon ring for supporting the passenger containing device and plate, a releasing device holding the cords under the control of the aeronaut, rupturable cords of different lengths connecting the balloon ring with the parachute, two sets of tapes of dissimilar lengths connected with the parachute, and release gear holding the free ends of said tapes, said gear being adapted to be operated to release both sets independently.

8. In aerial craft, the combination of a sustaining element, a passenger containing device, means for securing said passenger containing device to the sustaining element, a parachute, means for securing said parachute to the sustaining element, said passenger containing device and parachute being sustained in air by the sustaining element, a container for the parachute, a breaking piece connecting the apex of the parachute body with said container, a rigid plate closing said container, a channel in said plate, a shaft through said plate, flanged disks secured to said plate, collars on said shaft, spaced flanges carried by said collars, rods pivotally secured to said collar flanges, hooked members connected with said rods, cords from a balloon ring for supporting the passenger containing device and plate, operating handles and a spring biased locking member.

E. R. CALTHROP.